United States Patent [19]

Mathieu

[11] Patent Number: 5,345,791
[45] Date of Patent: Sep. 13, 1994

[54] TUBULAR TEXTILE INSERT FOR STRENGTHENING MATERIAL

[75] Inventor: Laurent Mathieu, Chateau de Gissey, France

[73] Assignee: C.R.S.T. (S.A.), Vitteaux, France

[21] Appl. No.: 148,006

[22] Filed: Nov. 4, 1993

Related U.S. Application Data

[62] Division of Ser. No. 936,898, Aug. 27, 1992, Pat. No. 5,285,661.

[51] Int. Cl.$^5$ ............................................. D04B 1/22
[52] U.S. Cl. ...................................... 66/190; 66/196; 428/225
[58] Field of Search ........................ 66/190, 196, 9 R; 139/11, 16, 14, DIG. 1, 383 B; 28/142, 101, 102, 158; 428/225, 253

[56] References Cited

U.S. PATENT DOCUMENTS

| | | | |
|---|---|---|---|
| 2,118,108 | 5/1938 | Riley | 66/190 |
| 3,178,910 | 4/1965 | Hammerle | 66/190 X |
| 3,327,501 | 6/1967 | Banlo | 66/190 X |
| 3,950,583 | 4/1976 | Patin | 28/101 X |
| 3,961,498 | 6/1976 | Braunschweiler | 66/190 X |
| 4,108,708 | 8/1978 | Gregory | 28/101 X |
| 4,722,203 | 2/1988 | Darjee | 66/190 X |

FOREIGN PATENT DOCUMENTS 301628 10/1932 Italy ...................................... 28/100

*Primary Examiner*—Clifford D. Crowder
*Assistant Examiner*—John J. Calvert
*Attorney, Agent, or Firm*—Eckert Seamans Cherin & Mellott

[57] ABSTRACT

A tubular textile insert for strengthening material is made of a stack of successive layers of parallel and interlinked threads. More particularly, there is a first-direction layer defining a cylindrical shape and form by several parallel threads arranged in a spiral relative to the central axis of the cylindrical shape. A second cylindrical layer is also formed in a cylindrical shape by several parallel threads arranged in a spiral, but at a pitch in the opposite direction to the spiral pitch of the first layer. The cylindrical shape defines a plurality of generating lines that are angularly spaced apart from one another and extend generally parallel to the central axis of the cylindrical shape. Several binding threads are arranged parallel to the generating lines and link the threads of the first and second layers together without piercing or crossing those threads of the first and second layers.

5 Claims, 2 Drawing Sheets

TUBULAR TEXTILE INSERT FOR STRENGTHENING MATERIAL

This is a division, of application Ser. No. 07/936,898 filed Aug. 27, 1992, U.S. Pat. No. 5,285,661.

BACKGROUND OF THE INVENTION

1. Field of the Invention

The invention concerns a tubular textile insert for strengthening material such as composite plastic material: it also refers to an apparatus for manufacturing this insert.

2. Prior Art

It is well know in the industry of composite material for strengthening plastic or similar material, particularly with tubular textile inserts. As we are already aware, the final properties of the composite material obtained, prinicipally take into account the positioning of the strengthening threads in the piece.

It is more general nowadays, that in order to obtain the high performance material, one draws up the fabric cuts from semi-manual positioning, the reproducibility of which sometimes uncertain.

In order to obtain multi-direction inserts a single-direction stack of elementary layers, combined with binding threads is produced. In any case, this binding stitching is uncertain and often crosses the roving or the threads of each single-direction layer which damages the deformation of the whole thing by preventing the slippage of the threads against each other.

The invention alleviates these disadvantages. It is aimed at a tubular textile insert of the type in question, which can be produced economically and automatically, and in which the threads can slide against each other.

SUMMARY OF THE INVENTION

This tubular textile insert for strengthening material, is made up of a stack of successive layers of parallel and interlinked threads and is characterised by what it consists of:

- a first single-direction cylindrical layer formed by several parallel contiguous threads arranged in a spiral in relation to the longitudinal axis of the cylinder.
- at least a second single-direction cylindrical layer is also formed by several parallel contiguous threads arranged in a spiral, but with the pitch lying in the opposite direction to the spiral pitch defined by the first layer.

The two layers cooperatively define a generally cylindrical plane. The cylindrical plane contains a plurality of phantom generating lines. Each generating line is angularly spaced apart from adjacent generating lines and extends generally parallel to the central axis of the cylindrical plane. Thus, there are several binding threads, arranged parallel to the generating line of the cylinder defined by these two layers, to link the strengthening threads together from the first and the second layers by forming knit loops to encompass the layers and allows for movement of the layers with respect to each other.

In other words the invention consists of producing a tubular textile insert made up of at least two cylindrical single-direction layers, in which the threads are tilted in relation to the axis of the cylinder but in the opposite pitch and in which the binding is produced without piercing or crossing the threads of each layer, which thus gives way to a certain amount of slippage of the threads on one layer in relation to the other and thus a deformation of the whole thing.

In practice, the advantages are:

- The pitch of the spiral of the first and second layers are the reverse by being equal or not:
- The whole thing can consist of a third layer of parallel contiguous strengthening threads positioned on or between the generating lines of the cylinder, arranged between the first and the second layer, the whole thing also being linked by the same binding threads.
- The whole thing can also consist of a fourth layer of contiguous threads, wound in a spiral:
- This layer can be formed by winding the strengthening thread in contiguous spirals which are perpendicular to the generating lines of the cylinder and linked to the Whole thing by means of binding thread.

The new tubular textile insert in accordance with the invention is distinguished from the state-of-the-art by two new properties, which are:

- First of all, the deformation of the whole thing, which leads to a variation in the diameter of the tubular structure and which enables conical shapes, the ribs on a shrunk tube or a larger diameter to be produced;
- On the other hand, the presence of the longitudinal, parallel strengthening threads which are regularly distributed on a generating line, which, whatever the shape, converge towards a summer, which up to now, was never possible manually.

As already explained, the invention also concerns an apparatus for manufacturing a tubular textile insert for strengthening in the way mentioned, made up of a stack of successive layers of parallel threads which enables this insert to be produced economically and automatically. This apparatus is characterised by consisting of the following:

- a frame with a cylindrical needle bed in its centre with its set of needles placed on the circumference of the needle bed, a controller triggers the movement of the needles;
- a concentric cylinder on the outside of the needle bed, carrying several thread carriers intended to receive the binding threads from several fixed, interdependent bobbins on the frame.
- an order or controller mechanism of the thread carriers, synchronised with the movement of the needles for forming the stitch;
- a central wheel rotating around the longitudinal axis of the needle bed holding several bobbins feeding the strengthening threads guided to the level of the needles to form a first layer of contiguous parallel threads which are arranged in a spiral.
- an external peripheral wheel, concentric to the needle bed and to the central wheel, rotating around the longitudinal axis of the needle bed, but in the opposite direction of that of the central wheel, carrying several bobbins feeding needles from the needle bed to form a second layer of contiguous parallel threads arranged in a spiral in the opposite direction to that of the first layer.
- an intermediate fixed wheel, placed between the central wheel and the external rotating peripheral wheel, carrying several bobbins, feeding the needles from the needle bed with strengthening threads, arranged according to the generating lines of the needle bed.

a drawing and winding device for the tubular textile insert is formed as follows:

the central wheel and the external rotary peripheral wheel will or will not be driven at the same angular speed.

the fixed, central concentric wheel is fixed to the frame by consoles which carry the thread carriers and the binding thread bobbins.

BRIEF DESCRIPTION OF THE DRAWINGS

The way in which the invention can be produced and the advantages which stem from it, can be seen in the production example as follows, with the aid of the diagrams which are enlisted in the appendix, in which.

BRIEF DESCRIPTION OF THE PREFERRED EMBODIMENT

Figure 5:
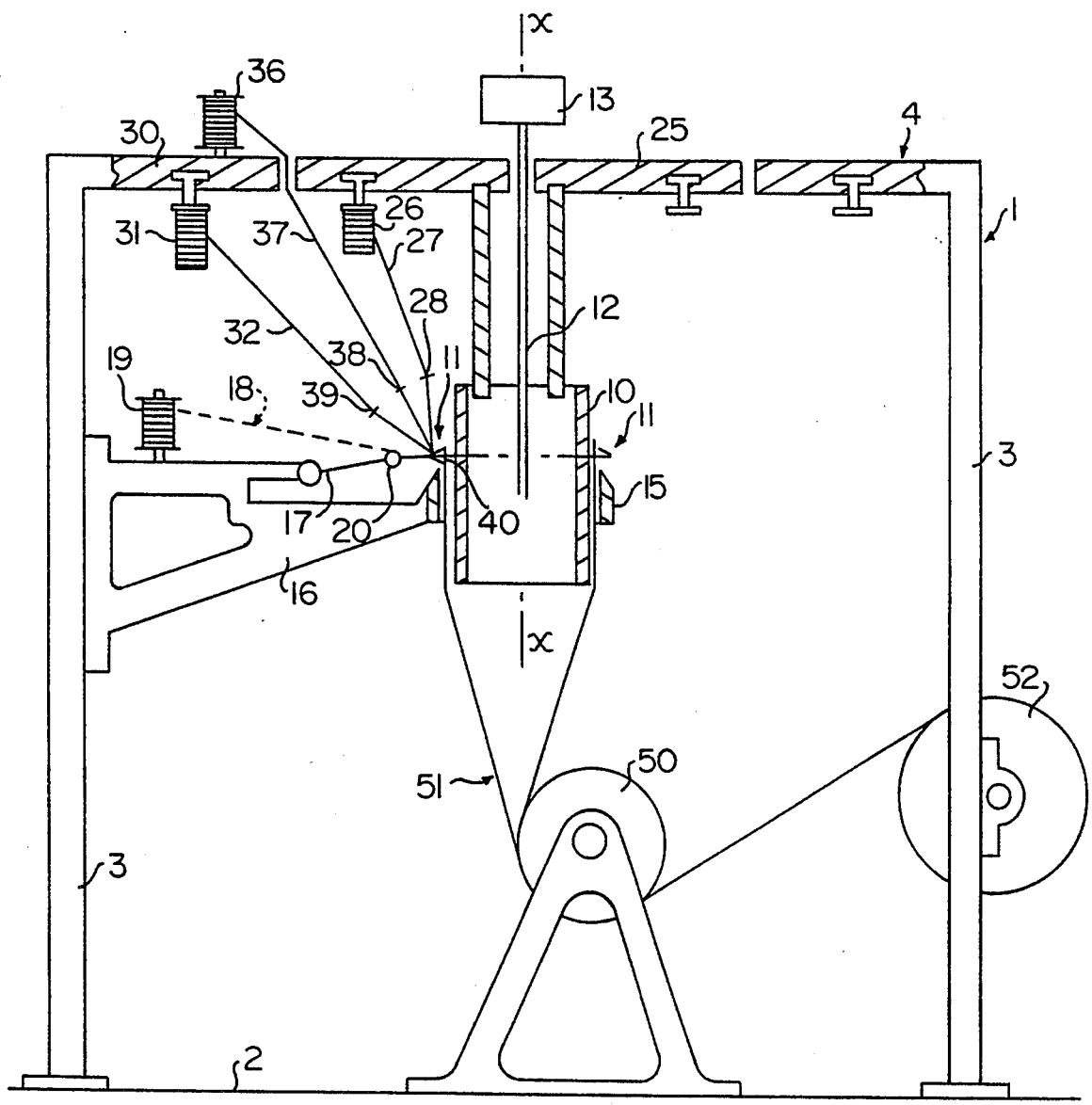
FIG. 5 is a schematic view showing an example of the production of the mechanism for manufacturing the tubular textile insert in accordance with the invention

As shown in FIG. 5, the apparatus in accordance with the invention first of all consists of a frame which is generally designed (1), placed on the ground (2), showing vertical supports (3) and a horizontal top part (4).

The frame has a cylindrical needle bed (1) in its centre which holds the needles (11). These needles (11) are placed on the whole of the circumference of the cylinder (10) in a horizontal level. A known order or controller (12), triggered by a mechanism (13) triggers the in and out movement of the needles (11).

A second concentric cylinder (15) which is outside of the needle bed (10) is fixed to the frame by means of consoles (16) interdependent from the vertical supports (3). These consoles carry the thread carriers (17) fed by the binding thread (18), unwound from the bobbins (19) fixed, interdependent from the console (16). This binding thread (18), after having crossed the eyelet of the thread carrier (17) then goes to the needles (11) to link the layers and to form the stitches.

The thread carriers (17) are ordered and triggered by a conventional cam-driven hinged-lever shown, not shown, which act in synchronization with the mechanism (13).

The horizontal top part (4) of the apparatus consists of a central wheel (25) which rotates around the axis of the vertical drive axle (X—X) of the needle bed (10). This central wheel (25) is rotated.

The drive as the wheel is rotated is (2D) carried out in synchronisation with the other movements, by any known and appropriate method such as gears, wheels with teeth and step-by-step motors.

This central wheel (25) has its lower side facing the bobbins (26) feeding the thread (27) from the guiding elements (28) up to the needles (11) to form the first layer (100) of the contiguous parallel threads arranged in a spiral in relation to the generating lines of the needle bed (10).

An external peripheral wheel (30) which is concentric to the needle bed (10) and to the central wheel (25), rotating around the longitudinal axis of the needle bed, but in the opposite direction of that of the central wheel, holding several bobbins (31) which feed the strengthening thread (32) to form the second layer (110) of contiguous parallel threads which is also arranged in a spiral, but in the opposite direction to the first layer (100).

As before, the drive of the wheel (30) is carried out in a known and appropriate method. In the same way, the production of this layer (110) is carried out under the same conditions as the layer (100), is also with the same guiding elements. By altering the angular rotary speeds of the two wheels (25) and (30), the tilt of the pitch of each of the spirals 110) can be varied. It should be noted that the pitch of each of the spirals (100, 110) are equal or not.

This apparatus also comprises, placed between two rotary wheels, central (25) and peripheral (30) respectively, several bobbins (36) that are supported by a fixed intermediate water (not shown), feeding the threads (37), the guiding elements (38) to the needles (11) from the needle bed, to form a layer of intermediate contiguous, parallel threads (120) according to the generating line of the needle bed.

As it is understood, the three layers (100, 110, 120) which are a feature of this invention, all three formed from a layer of contiguous parallel threads, but respectively tilted in the right spiral (100), in the left spiral (110) and in the parallel threads (110) are fed to the guiding elements (28, 38, 39) to arrive at the point of convergence (40) at the level of the needles (11). This point of convergence is known by the operator as the point of production.

Figure 1:
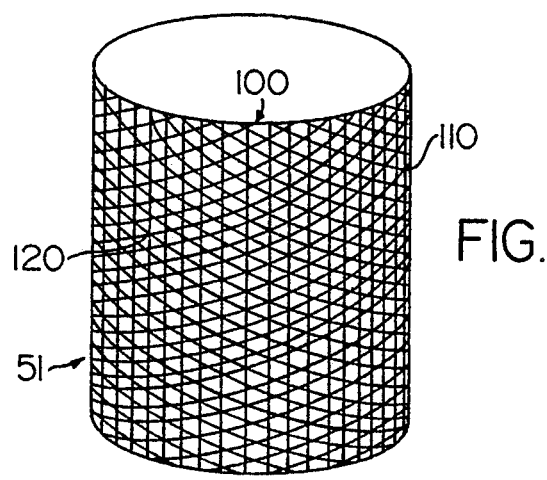
FIG. 1 is a schematic view showing the tubular textile insert in accordance with the invention.
Figure 2:
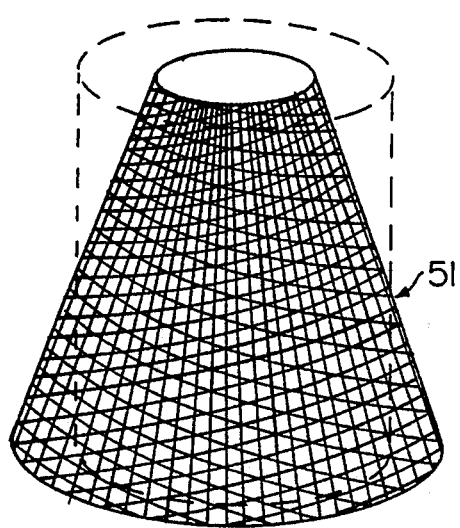
FIGS. 2 and 3 show examples of the deformation of the tubular textile insert illustrated in FIG. 1.
Figure 3:
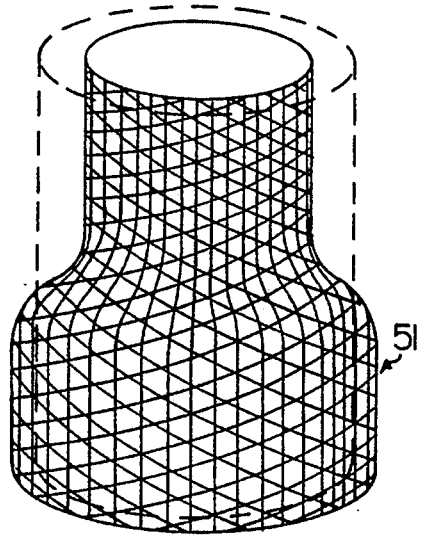
Figure 4:
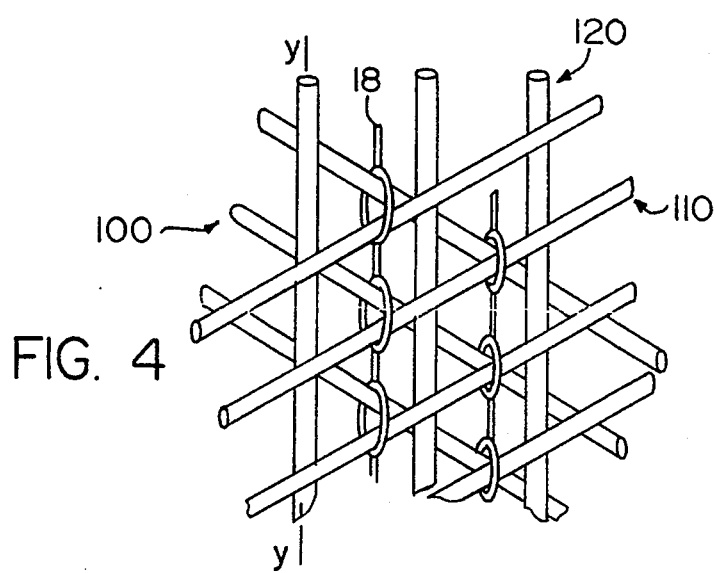
FIG. 4 is a partial view on a large scale showing the linking principle of different layers to enable a certain deformation of the whole thing.

According to the important feature of the invention, the stitching of the needles across the layers (100, 110, 120) carried out without piercing nor crossing the strengthening thread (27, 32, 37) to enable certain deformation of the whole thing. Each strengthening thread can slide in the loops of the stitches which have been formed by the binding thread (18). Refer to FIG. 4, which shows the binding principle of the different layers. FIG. 4 also shows a representative generating line Y—Y.

The apparatus comprises of a drawing system known to draw up the formed textile insert (D1) and to re-empty it in the form of a bobbin (52). The drive motor which is not represented from the winding bobbin ( 52 ) acts in synchronisation With the order mechanism (13).

The apparatus according to the invention enables tubular textile inserts to be produced economically and automatically in multi-directions:

in which the binding thread does not hold back the threads of each layer when slipping in which there no interference the layers of the elementary thread and each have their own direction and nature.

in which the tubular geometry is variable this insert can be produced in various, natural, synthetic, continuous filament, fibres, roving threads, etc. and can receive the most varied applications in the field of composite material.

the capacity of the bobbins, the structure and the geometry of the machines, enables tubular structures in large diameters to be obtained.

I claim:

1. Tubular textile inserts to strengthen material, made up of a stock of successive layers of contiguous parallel threads linked together, comprising:
   a first single-direction cylindrical layer (27) defining a central axis and formed from several contiguous parallel threads arranged in a spiral in relation to the central axis, the spiral arrangement defining a first pitch;
   at least a second single-dash direction cylindrical layer (32), also formed from several contiguous parallel threads arranged in a spiral but at a pitch disposed in a direction opposite to the first pitch;
   the two layers cooperatively defining a generally cylindrical plane, the cylindrical plane containing a plurality of generating lines, each generating line is angularly spaced apart from adjacent generating lines and extends generally parallel to the central axis;
   several binding threads (18), arranged parallel to the generating lines of the cylindrical plane, to link together the threads of the first and the second layers, said binding threads interlocking said layers by forming knit loops encompassing said layers in a manner to allow movement of one of the layers with respect to the other layer.

2. Insert in accordance with claim 1, wherein the pitch of the spiral of the first and the second layers being in opposite directions being of equivalent angular value.

3. Insert in accordance with claim 1, further comprising of a third layer of contiguous parallel threads positioned on or between the generating lines of the cylinder, arranged between the first and the second layer.

4. Insert in accordance with claim 2, further comprising a third layer of contiguous parallel strengthening threads positioned on or between the generating lines of the cylindrical plane, arranged between the first and second layer.

5. Insert in accordance with claim 1, wherein the pitch of the spiral of the first and second layers being in opposite directions and having non-equivalent angular values.

* * * * *